(12) United States Patent
Schindler et al.

(10) Patent No.: US 7,833,301 B2
(45) Date of Patent: Nov. 16, 2010

(54) ENGINE EXHAUST COOLER AND AIR PRE-CLEANER ASPIRATOR

(75) Inventors: Rodney A. Schindler, Bettendorf, IA (US); Alan D. Sheidler, Moline, IL (US)

(73) Assignee: Deere & Company, Moline, IL (US)

( * ) Notice: Subject to any disclaimer, the term of this patent is extended or adjusted under 35 U.S.C. 154(b) by 355 days.

(21) Appl. No.: 12/130,254

(22) Filed: May 30, 2008

(65) Prior Publication Data

US 2009/0293836 A1 Dec. 3, 2009

(51) Int. Cl.
*B01D 50/00* (2006.01)

(52) U.S. Cl. .......................... 55/385.3; 55/468; 55/419; 55/DIG. 28; 55/DIG. 30; 123/198 E; 60/320; 60/315; 60/316; 60/319; 95/32; 95/267; 96/327; 96/378; 96/389

(58) Field of Classification Search ................. 55/385.3, 55/468, DIG. 28, DIG. 30, 419; 95/32, 267; 96/372, 378, 389; 60/320, 315, 316, 319; 123/198 E See application file for complete search history.

(56) References Cited

U.S. PATENT DOCUMENTS

| | | | |
|---|---|---|---|
| 2,188,444 A | * | 1/1940 | Sauer .......................... 60/617 |
| 2,586,788 A | | 2/1952 | Cushman |
| 3,875,745 A | | 4/1975 | Franklin |
| 3,899,923 A | | 8/1975 | Teller |
| 3,907,940 A | * | 9/1975 | Thatcher ........................ 261/1 |
| 4,197,703 A | | 4/1980 | Holmes |
| 4,792,014 A | | 12/1988 | Shin-Seng |
| 4,926,638 A | | 5/1990 | Kakuta |
| 5,611,203 A | | 3/1997 | Henderson et al. |
| 6,267,106 B1 | | 7/2001 | Feucht |
| 7,281,530 B2 | | 10/2007 | Usui |
| 2005/0205355 A1 | | 9/2005 | Lin |
| 2006/0144046 A1 | | 7/2006 | Vetrovec |
| 2006/0277901 A1 | * | 12/2006 | Allegre et al. ................. 60/317 |
| 2007/0245725 A1 | | 10/2007 | Brown et al. |
| 2007/0261399 A1 | | 11/2007 | Mallampalli et al. |

* cited by examiner

*Primary Examiner*—Jason M Greene
*Assistant Examiner*—Dung Bui
(74) *Attorney, Agent, or Firm*—Taylor IP, P.C.

(57) ABSTRACT

A diffuser for a work machine having an air breathing fuel consuming internal combustion engine with an exhaust aftertreatment device periodically elevating the exhaust temperatures to a high level. The diffuser has a venturi section and the excess contaminants from an intake air pre-cleaner are directed to the throat of the venturi to aspirate and dispose of excess contaminants while cooling the exhaust flow. Additional openings in the divergent section of the diffuser assist in providing significant reductions in exhaust temperatures within a short axial envelope.

24 Claims, 2 Drawing Sheets ns, the pre-cleaner having an outlet for
ENGINE EXHAUST COOLER AND AIR PRE-CLEANER ASPIRATOR

FIELD OF THE INVENTION

The invention relates to aspirators for air cleaning systems, and more specifically, to aspirators used with internal combustion engines.

BACKGROUND OF THE INVENTION

The class of work machines utilized for agricultural, industrial and other uses, termed as work machines, typically operates in a highly contaminated environment, thus making the function of cleaning air used by an air breathing internal combustion engine, especially important. Nowhere is this as important as in the agricultural field where the work machine is in a field harvesting crops which generates significant contaminants in the form of chaff and dust. It is necessary for such machines to have a pre-cleaner since the ambient level of contaminant is so significant. A filter alone would quickly become clogged.

In the present environment, pre-cleaners are employed upstream of the primary filter for the intake system of the engine. Such pre-cleaners take various forms, but as used commercially, are systems that impart a centrifugal motion to the air leading to the primary air filter inlet. Such centrifugal motion causes the denser contaminants to be thrown to the outer periphery of the pre-cleaner, leaving the less contaminated air to exit to the primary filter through a central inlet. Such air pre-cleaners have an outlet for the accumulated contaminants and some units have that outlet connected to an aspirator positioned in a muffler positioned in the engine exhaust system.

With the advent of environmental protection agency (EPA) emissions regulations applying to off highway work machines, it is become necessary to employ exhaust aftertreatment devices, including diesel particulate filters. Such devices require periodic burning of the accumulated soot particles to prevent clogging of the particulate filter. The process of cleaning such particles, commonly referred to as regeneration, causes a significant increase in the temperature of the exhaust, reaching levels as high as 600° C. This elevated temperature represents a potential problem in the contaminated environment of the work.

Accordingly, a need exists in the art to provide an effective and compact way of cooling the engine exhaust, at the same time providing a way of discarding contaminants collected in a pre-cleaner.

SUMMARY OF THE INVENTION

In one form, the invention is an air pre-cleaner aspirator system for an air breathing, fuel consuming internal combustion engine having an air intake and an exhaust for the products of combustion at elevated temperatures. The engine has a pre-cleaner fluidly connected to and upstream of the engine air intake, the pre-cleaner preventing flow of larger contaminants into the engine air intake and accumulating such contaminants. The pre-cleaner has an outlet for such contaminants. The air pre-cleaner aspirator system includes an element defining a primary flow path for engine exhaust, the element having a venturi section. A tube has an outlet within the element adjacent the venturi section, the tube being fluidly connected to the pre-cleaner outlet for contaminants so that contaminants and ambient air are drawn into and through the tube. The element has at least one inlet for ambient air into the primary flow path for cooling the engine exhaust stream adjacent the element.

In another form the invention is an internal combustion engine system having an air breathing, fuel consuming internal combustion engine with an air intake and an exhaust for products of combustion. An exhaust aftertreatment system receiving the products of combustion generates periodic, significantly elevated temperatures. An air filtration system including a pre-cleaner is fluidly connected to and upstream of the engine air intake, the pre-cleaner preventing flow of larger contaminants into the engine air intake and accumulates such contaminasuch contaminants. An element defining a primary fluid flow path for engine exhaust from said exhaust aftertreatment system has a venturi section. A tube has an outlet within the element and adjacent the venturi section, the two being fluidly connected to the pre-cleaner outlet for contaminants so that contaminants and ambient air are drawn into and through the tube to cool the exhaust. The element has at least one inlet for ambient air for further cooling the engine exhaust.

In another form, the invention is a work machine operating in a significantly contaminant laden environment, the work machine having a power train for propelling and powering processing functions of the work machine. An air breathing, fuel consuming internal combustion engine has an air intake and an exhaust for products of combustion. An exhaust aftertreatment system receives exhaust from said engine and generates periodic, significantly elevated temperatures. An air filtration system includes a pre-cleaner fluidly connected to and upstream of the engine air intake, the pre-cleaner preventing flow of larger contaminants into the engine air intake and accumulating such contaminants. The pre-cleaner has an outlet for such contaminants. An element defining a primary fluid flow path receives engine exhaust from the exhaust aftertreatment system, the element having a venturi section. A tube having an outlet within the element and adjacent the venturi section is fluidly connected to the pre-cleaner outlet for contaminants so that contaminants and ambient air are drawn into and through the tube to cool the exhaust. The element has at least one inlet for ambient air for further cooling the engine exhaust.

In yet another form, the invention is a compact exhaust cooling system for an air breathing fuel consuming internal combustion engine having an air intake and an exhaust for the products of combustion at elevated temperatures. The said system includes an element having an annular wall defining a primary flow path for engine exhaust, the element having a venturi section. At least one tube has an outlet within the element adjacent the venturi section, the tube being fluidly connected to ambient so that cooling air is drawn into and through the tube. The element has at least one inlet for ambient air into the primary flow path through the annular wall for cooling the engine exhaust stream adjacent the wall of the element.

DETAILED DESCRIPTION OF THE INVENTION

Figure 1:
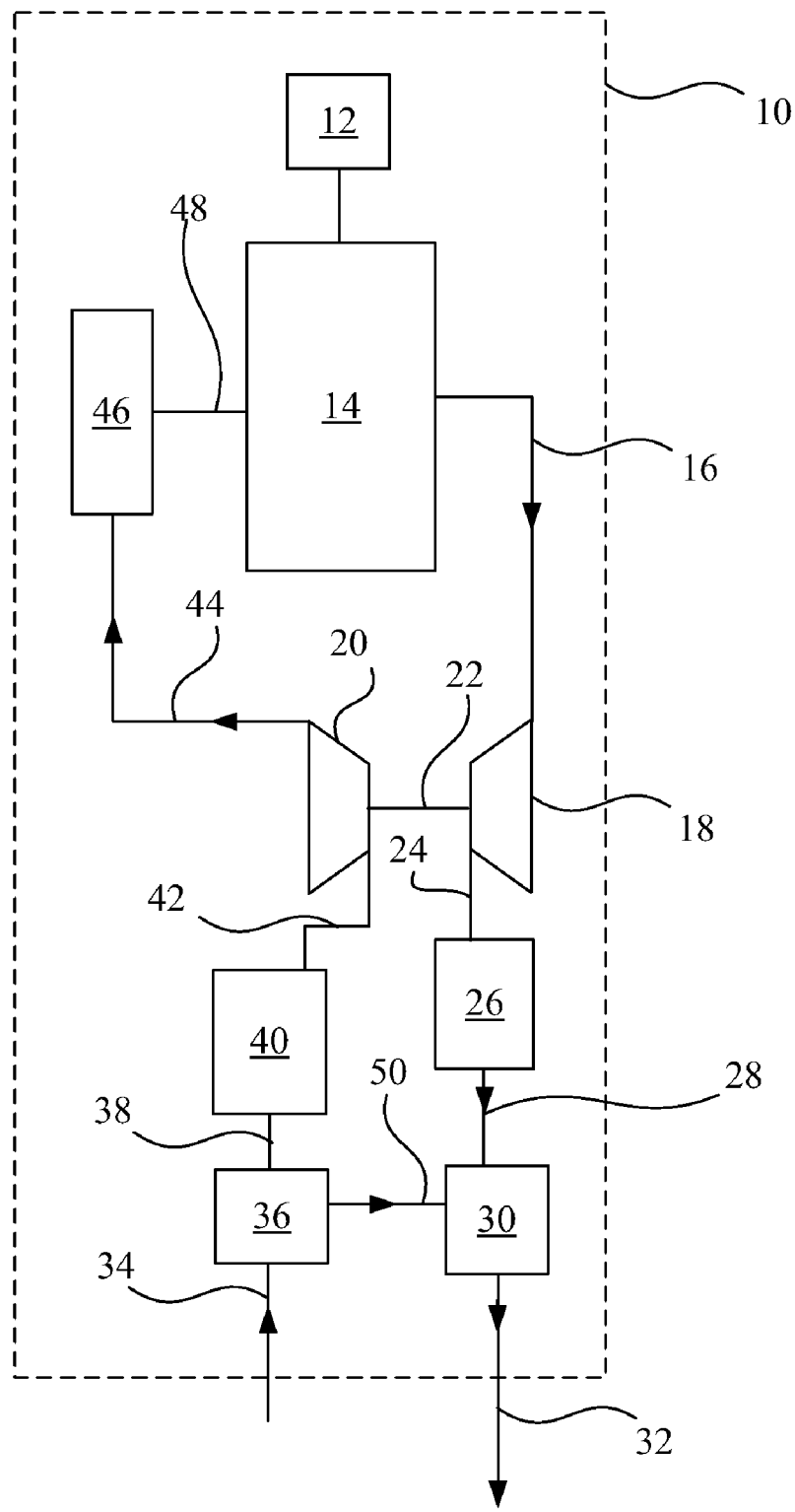
FIG. 1 is a schematic view of a work machine in which the present invention is employed.

Referring to FIG. 1, there is shown a portion of a work machine 10 in the form of an agricultural vehicle, particularly the rear end drive train of the vehicle. Although shown as an agricultural vehicle it is possible the work machine 10 could be in the form of a different type of work machine such as a construction or forestry vehicle.

Work machine 10 includes a transmission 12 providing motive power to the work machine 10 as well as power agriculture crop harvesting and processing components as well as various hydraulic accessory devices. Transmission 12 is powered by an air breathing fuel consuming internal combustion engine, generally shown at 14. Internal combustion engine 14 exhausts the products of combustion to an exhaust line 16 extending to a turbine 18 which drives a compressor 20 through a mechanical interconnection 22. The exhaust from turbine 18 passes through line 24 to an exhaust aftertreatment device 26.

Exhaust aftertreatment device 26 may incorporate a number of elements that usually include an oxidization catalyst and a particulate filter, both of which are not shown to simplify the understanding of the invention. The particulate filter discharges gases through a line 28 to a diffuser 30 to be described below and finally to an outlet line 32 where it is exhausted to ambient. The particulate filter within device 26 requires periodic regeneration of accumulated carbon particles on the filter by elevating the upstream temperature to around 300° C. This causes the soot particles within the filter to burn thus increasing the exhaust temperature up to around 600° C. which requires management by the diffuser 30 to bring temperatures within acceptable limits.

Ambient air passes by inlet line 34 through a pre-cleaner 36 and line 38 to a primary air filter 40. The outlet 42 of primary air filter 40 passes to the compressor 20 and from there through a line 44, usually through an aftercooler or intercooler 46 to intake 48 for the internal combustion engine 14.

Figure 2:
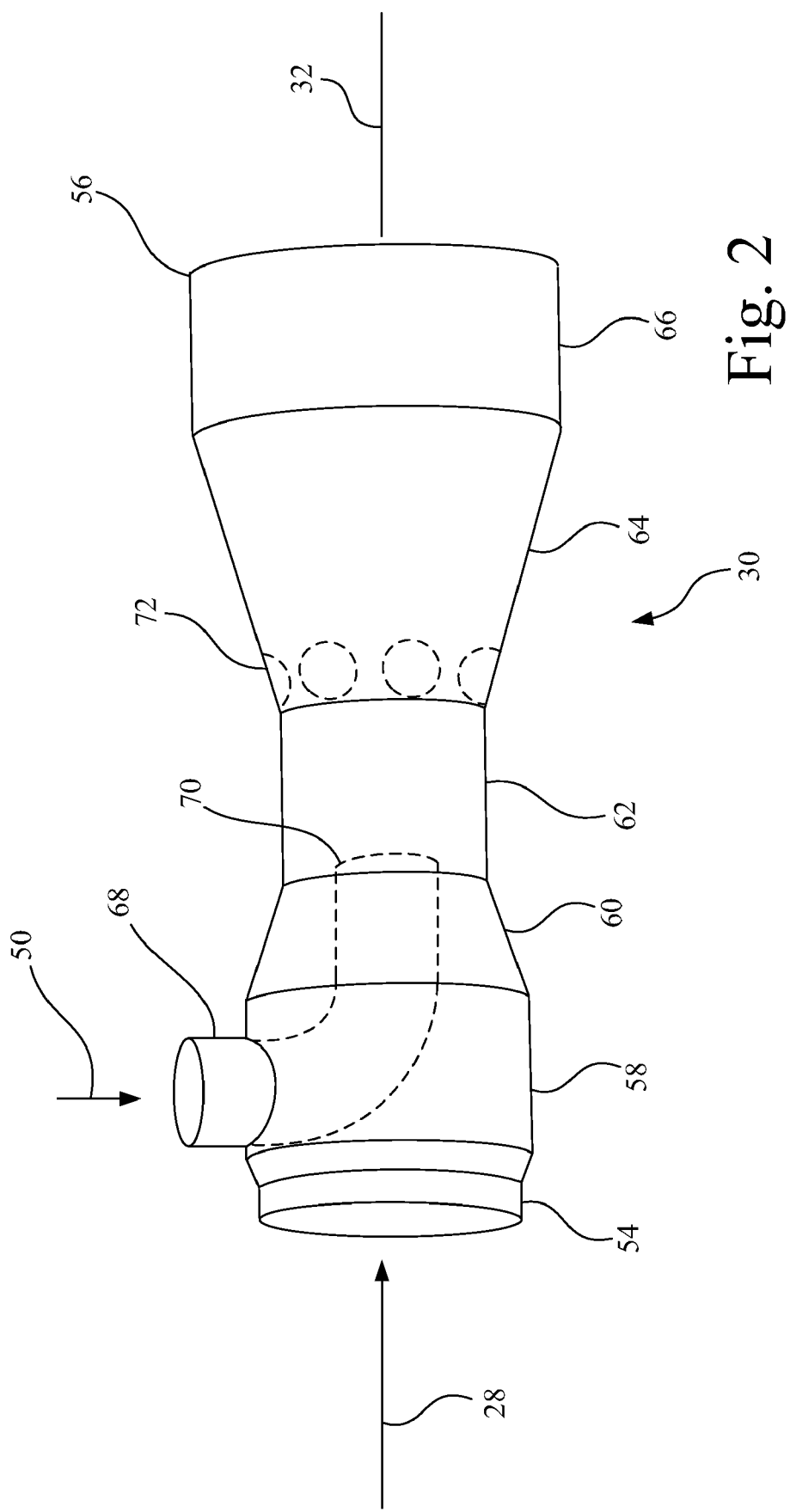
FIG. 2 is a side view of an air pre-cleaner aspirator incorporated in the schematic of FIG. 1.

The work machine 10 has two sets of material required to be disposed of. First is material from the pre-cleaner 36. Pre-cleaner 36 usually involves some form of device imparting a centrifugal flow to the air passing from inlet 34 so that the heavier particles are spun to a periphery and have and are collected in an outlet line 50. Pre-cleaner devices of this type are commercially available through a number of companies. At the same time the material from the debris and excess contaminants needs to be disposed of from line 50, the air from downstream of the particulate filter in line 28 is required to be cooled. In accordance with the present invention, the diffuser shown in detail in FIG. 2 is employed.

The diffuser, generally indicated by reference character 30, has an inlet end 54 connected to line 28 from the aftertreatment device 26 and an outlet 56 connected to exhaust line 32 leading to ambient. The inlet of diffuser 52 has an initial inlet section 58 leading to a convergent annular section 60, a throat 62, divergent section 64 and outlet section 66 to form a venturi. As illustrated, the various sections are annular in cross-section although some variation from annular may be employed. It should be noted that the cross-sectional flow area of inlet section 58 leading to convergent section 60 is smaller than the flow area of the downstream and of divergent section 64 as it intersects outlet section 66. A pipe 68 extends through the wall of inlet section 58 and curves through 90° to an outlet 70 positioned approximately adjacent the upstream end of the throat 62. Pipe 68 is connected to line 50 leading from the pre-cleaner 36 and extends into the diffuser at a right angle to the longitudinal axis of the diffuser 30 and curves to have an outlet parallel to the primary airflow through diffuser 30. The cross-sectional flow area of tube 68 is sufficiently large to pass expected contaminant particle sizes along with ambient air.

At least one, and preferably a plurality of openings 72, are provided adjacent the upstream end of divergent section 64. Openings 72 provide and allow passage of air from the ambient into the interior of diffuser section 64.

In operation, the internal combustion engine 14 requires a flow of inlet air which passes through pre-cleaner 36 as the work machine 10 travels through highly contaminated environments such as harvesting crops in the field, excess debris passes into the pre-cleaner 36 where it is centrifugally directed to be collected by line 50. As the exhaust flow passes from the exhaust aftertreatment device 26, the air passing by the outlet 70 of tube 68 causes a drop in pressure which in turn draws air from line 50 by aspiration through pipe 68 and out of outlet 70 where it is mixed with exhaust flow. In addition to disposing of the excess contaminants, the ambient flow from the pre-cleaner 36 causes a reduction in temperature in the flow from line 28 particularly with the exhaust aftertreatment devices being regenerated. The openings 72, provided at the upstream portion of divergent section 64, provide additional flow of ambient air to cool the walls of the diffuser section to thereby provide a synergy where the flow from the pre-cleaner cools the core of the flow through the diffuser 52 and the air from the opening 72 provide cooling of the walls. Accordingly, the diffuser 52 not only provides disposal of the excess contaminants from the pre-cleaner but it cools the exhaust flow directed through outlet 32 to a manageable level for the operating environment of the work machine. It should be noted that the dual cooling function enables significant temperature reductions within a relatively short axial envelope and can be used to cool the exhaust flow independent of an aspirating function.

Having described the preferred embodiment, it will become apparent that various modifications can be made without departing from the scope of the invention as defined in the accompanying claims.

The invention claimed is:

1. An air pre-cleaner aspirator system for an air breathing fuel consuming internal combustion engine having an air intake and an exhaust for the products of combustion at elevated temperatures, said engine having a pre-cleaner fluidly connected to and upstream of the engine air intake, said pre-cleaner preventing flow of larger contaminants into the engine air intake and accumulating such contaminants, said pre-cleaner having an outlet for such contaminants, said system comprising:

an element defining a primary flow path for engine exhaust, said element having a venturi section;

a tube having an outlet within said element adjacent said venturi section, said tube being fluidly connected to the pre-cleaner outlet for contaminants so that contaminants are drawn into and through said tube; and said element having at least one inlet for ambient air into the primary flow path for cooling the engine exhaust stream adjacent said element.

2. An air pre-cleaner aspirator system as claimed in claim 1, wherein said element has a converging section, downstream throat and divergent section connected to said throat, the outlet of said tube being at the upstream portion of said throat.

3. An air pre-cleaner aspirator system as claimed in claim 2, wherein the flow area at the upstream portion of said converging section is less than the flow area at the downstream side of said divergent section.

4. An air pre-cleaner aspirator system as claimed in claim 1, wherein said tube has a cross-sectional flow area sufficiently large to carry contaminants into said primary flow path.

5. An air pre-cleaner aspirator system as claimed in claim 1, wherein said primary flow path is defined by an annular wall and said wall has a plurality of openings forming an inlet for ambient air for cooling up the primary flow path adjacent said wall.

6. An air pre-cleaner aspirator system as claimed in claim 5, wherein the walls of said element form a convergent, throat and divergent section, said plurality of openings being positioned at the beginning of said divergent section.

7. An air pre-cleaner aspirator system as claimed in claim 1, wherein said tube enters said element at right angles to the primary flow path and the outlet of said tube is in a direction substantially parallel to the flow through said element.

8. An internal combustion engine system comprising:
    an air breathing, fuel consuming internal combustion engine having an air intake and an exhaust for products of combustion;
    an exhaust aftertreatment system generating periodic significantly elevated temperatures;
    an air filtration system including a pre-cleaner fluidly connected to and upstream of the engine air intake, said pre-cleaner preventing flow of larger contaminants into the engine air intake and accumulating such contaminants, said pre-cleaner having an outlet for such contaminants;
    an element defining a primary fluid flow path for engine exhaust from said exhaust aftertreatment system, said element having a venturi section;
    a tube having an outlet within said element and adjacent said venturi section, said tube being fluidly connected to the pre-cleaner outlet for contaminants so that contaminants and air are drawn into and through said tube, to cool said exhaust; and
    said element having at least one inlet for ambient air for further cooling the engine exhaust.

9. An internal combustion engine system as claimed in claim 8, wherein said element defines a convergent section connected with a throat and a divergent section, the outlet of said tube being positioned adjacent the upstream portion of said throat.

10. An internal combustion engine system as claimed in claim 9, wherein the cross-sectional flow area of the upstream portion of said convergent section is smaller than the flow area of the downstream portion of said divergent section.

11. An internal combustion engine system as claimed in claim 8, wherein the cross-sectional flow area of said tube is sufficiently large to carry contaminants to said primary flow path.

12. An internal combustion engine system as claimed in claim 8, wherein said element has a wall defining said primary flow path, said openings being positioned in the wall of said flow path for cooling the primary flow path adjacent the walls of said element.

13. An air pre-cleaner aspirator as claimed in claim 12, wherein said wall sections define an upstream converging section, a throat and a downstream divergent section, said openings being positioned at the adjacent upstream portion of said divergent section.

14. An air pre-cleaner aspirator as claimed in claim 8, wherein said tube enters said element at substantially a right angle to said primary flow path, said tube being curved to have a discharge substantially parallel to the primary flow path therethrough.

15. A work machine operating in a significantly contaminant laden environment, said work machine comprising:
    a power train for propelling and powering processing functions of said work machine;
    an internal combustion engine system comprising:
        an air breathing, fuel consuming internal combustion engine having an air intake and an exhaust for products of combustion;
        an exhaust aftertreatment system generating periodic significantly elevated temperatures;
        an air filtration system including a pre-cleaner fluidly connected to and upstream of the engine air intake, said pre-cleaner preventing flow of larger contaminants into the engine air intake and accumulating such contaminants, said pre-cleaner having an outlet for such contaminants;
        an element defining a primary fluid flow path for engine exhaust from said exhaust aftertreatment system, said element having a venturi section;
        a tube having an outlet within said element and adjacent said venturi section, said tube being fluidly connected to the pre-cleaner outlet for contaminants so that contaminants and air are drawn into and through said tube, to cool said exhaust; and
        said element having at least one inlet for ambient air for further cooling the engine exhaust.

16. A work machine as claimed in claim 15, wherein said element has a converging section, throat and downstream divergent section, the outlet of said tube being adjacent the upstream portion of said throat.

17. A work machine as claimed in claim 16, wherein the cross-sectional flow area of the upstream portion of said converging section is smaller than the cross-sectional flow area of the downstream portion of said divergent section.

18. A work machine as claimed in claim 15, wherein the cross-sectional flow area of said tube is large enough to carry contaminants into said primary flow path.

19. A work machine as claimed in claim 15, wherein said flow path through said element is defined by wall sections, said element having a plurality of openings forming said inlet for ambient air so that the flow path adjacent the wall sections is cooled.

20. A work machine as claimed in claim 19, wherein said wall sections form an upstream converging section, a throat and a downstream divergent section, said openings being positioned adjacent the upstream portion of said divergent section.

21. A work machine as claimed in claim 15, wherein said tube enters said element at substantially a right angle to said primary flow path, said tube being curved to have a discharge substantially parallel to the primary flow path therethrough.

22. A compact exhaust cooling system for an air breathing fuel consuming internal combustion engine having an air intake and an exhaust for the products of combustion at elevated temperatures, said system comprising:
    an element having an annular wall defining a primary flow path for engine exhaust, said element having a venturi section;
    at least one tube having an outlet within said element adjacent said venturi section, said tube being fluidly connected to ambient so that cooling air is drawn into and through said tube; and said element having at least one inlet for ambient air into the primary flow path through said annular wall for cooling the engine exhaust stream adjacent the wall of said element.

23. A work machine as claimed in claim 22, wherein said element has a plurality of openings forming said inlet for ambient air so that the flow path adjacent and around the wall sections is cooled.

24. A work machine as claimed in claim 23, wherein said wall forms an upstream converging section, a throat and a downstream divergent section, said openings being positioned adjacent the upstream portion of said divergent section.

* * * * *

(12) EX PARTE REEXAMINATION CERTIFICATE (9739th)
United States Patent
Schindler et al.

(10) Number: US 7,833,301 C1
(45) Certificate Issued: Jul. 9, 2013

(54) ENGINE EXHAUST COOLER AND AIR PRE-CLEANER ASPIRATOR

(75) Inventors: Rodney A. Schindler, Bettendorf, IA (US); Alan D. Sheidler, Moline, IL (US)

(73) Assignee: Deere & Company, Moline, IL (US)

Reexamination Request:
No. 90/012,386, Jul. 5, 2012

Reexamination Certificate for:
Patent No.: 7,833,301
Issued: Nov. 16, 2010
Appl. No.: 12/130,254
Filed: May 30, 2008

(51) Int. Cl.
*B01D 50/00* (2006.01)

(52) U.S. Cl.
USPC ......... 55/385.3; 55/468; 55/419; 55/DIG. 28; 55/DIG. 30; 123/198 E; 60/320; 60/315; 60/316; 60/319; 95/32; 95/267; 96/327; 96/378; 96/389

(58) Field of Classification Search
None
See application file for complete search history.

(56) References Cited

To view the complete listing of prior art documents cited during the proceeding for Reexamination Control Number 90/012,386, please refer to the USPTO's public Patent Application Information Retrieval (PAIR) system under the Display References tab.

*Primary Examiner* — Joseph A. Kaufman

(57) ABSTRACT

A diffuser for a work machine having an air breathing fuel consuming internal combustion engine with an exhaust aftertreatment device periodically elevating the exhaust temperatures to a high level. The diffuser has a venturi section and the excess contaminants from an intake air pre-cleaner are directed to the throat of the venturi to aspirate and dispose of excess contaminants while cooling the exhaust flow. Additional openings in the divergent section of the diffuser assist in providing significant reductions in exhaust temperatures within a short axial envelope.

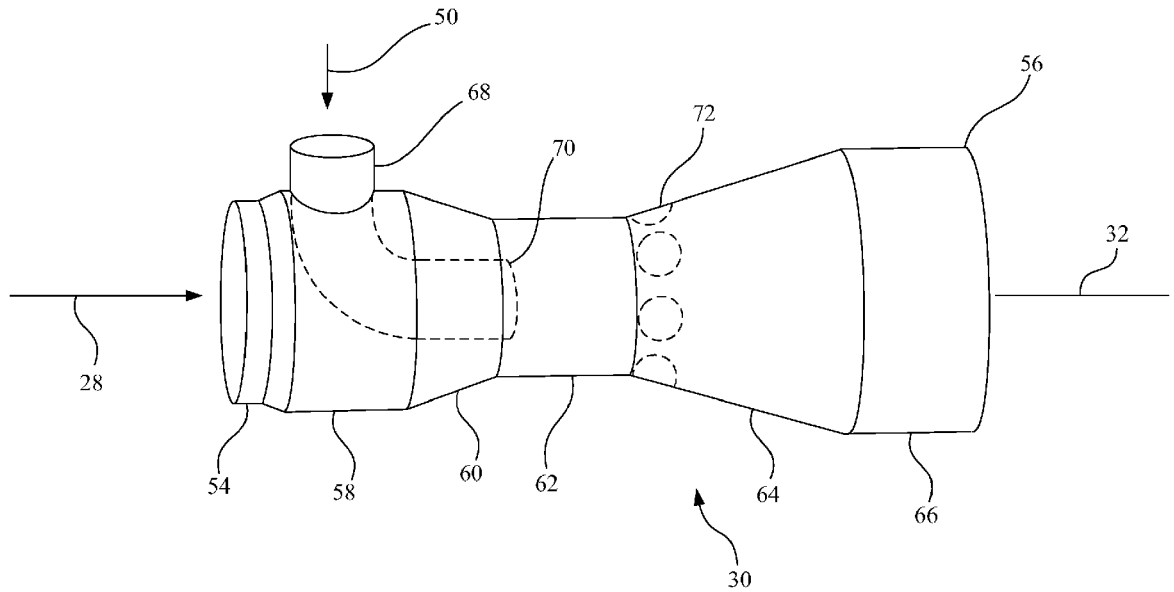

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 22 is determined to be patentable as amended.

Claims 23 and 24, dependent on an amended claim, are determined to be patentable.

Claims 1-21 were not reexamined.

22. A compact exhaust cooling system for an air breathing fuel consuming internal combustion engine having an air intake and an exhaust for the products of combustion at elevated temperatures, said system comprising:

an element having an annular wall defining a primary flow path for engine exhaust, said element having a venturi section;

at least one tube having an outlet within said element adjacent said venturi section *said outlet being parallel to said primary flow path*, said tube being *curved to a right angle relative to said primary flow path and being* fluidly connected to ambient so that cooling air is drawn into and through said tube; and said element having at least one inlet for ambient air into the primary flow path through said annular wall for cooling the engine exhaust stream adjacent the wall of said element.

* * * * *